(No Model.)

M. N. ROGERS.
SOAKING BOOT.

No. 519,047. Patented May 1, 1894.

Witnesses.
Chas. E. Van Dorn.
C. F. Lyon

Inventor,
Milton N. Rogers.
By Paul & Hawley
his Attorneys.

UNITED STATES PATENT OFFICE.

MILTON N. ROGERS, OF MINNEAPOLIS, MINNESOTA.

SOAKING-BOOT.

SPECIFICATION forming part of Letters Patent No. 519,047, dated May 1, 1894.

Application filed December 9, 1893. Serial No. 493,273. (No model.)

*To all whom it may concern:*

Be it known that I, MILTON N. ROGERS, of the city of Minneapolis, county of Hennepin, State of Minnesota, have invented a certain new and Improved Soaking-Boot, of which the following is a specification.

My invention relates to a soaking boot for use in applying soaking liquid or compound to the hoofs of horses, the object of such treatment being to soften and render the hoof less brittle.

The object which I have in view is to provide a boot which shall be water-tight, which shall fit snugly upon and conform to the shape of the animal's hoof and ankle; and further to provide a boot which cannot be shaken from the hoof and from which the liquid cannot be spilled; and a further object is to so construct the boot as to make the same easy upon the hoof and ankle and thus prevent worrying the animal, and which shall further be very strong and durable.

My invention consists in general in the construction and combinations all as hereinafter described and particularly pointed out in the claims.

The invention will be more readily understood by reference to the accompanying drawings, in which—

Figure 1:
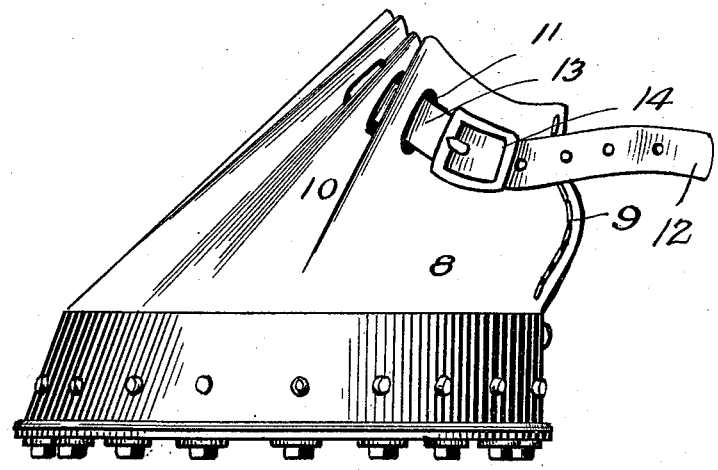
Figure 2:
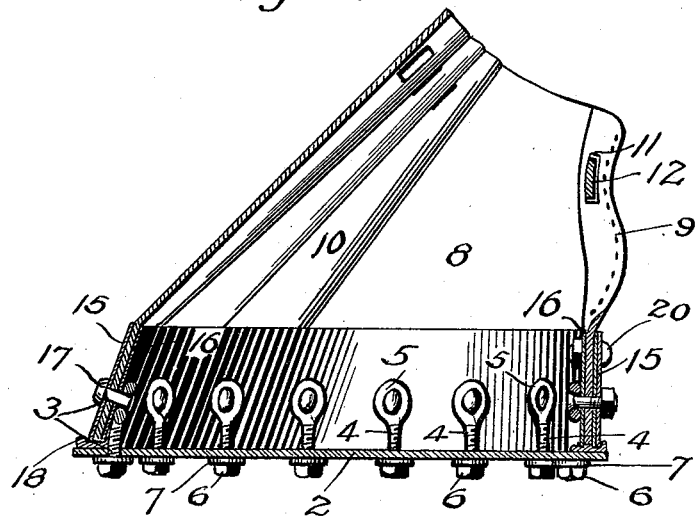

Figure 1 is a side elevation of a soaking boot embodying my invention. Fig. 2 is a sectional view thereof.

As shown in the drawings, 2 represents a thin but strong steel plate, considerably larger than the horse's hoof and having around its edge a series of small bolt holes 3. Through these extend the eye-bolts 4 having the eyes 5 and the threaded lower ends upon which the burrs or nuts 6 are turned and then riveted. A leather, cloth or rubber washer 7 is preferably interposed between each nut and the under side of the plate 2.

The top of the shoe is composed of a single piece 8 of strong leather sewed together at the back, as shown at 9, and provided in its forward part with deep crimps 10. Strap holes 11 are made in the crimped upper part of the flexible top and also through the rib at the back. Through these a strap 12 is inserted, the buckle end of the strap being preferably riveted or sewed to the side of the top, while the opposite end of the strap is left free to be drawn through the buckle 14 and fastened therein. The lower edge of the flexible top passes down between the outer and inner annular rings or plates 15 and 16, and rivets or screws 17 pass through both plates and through the interposed leather, and are fastened on the inside in the eyes 5 of the bolts 4. Either the extreme lower part of the leather 8 is turned out by the plate 16, or a separate flexible packing 18 is interposed between the lower edges of the plates and the plate 2, so that upon tightening the nuts 6 the plates are drawn down firmly and a water-tight joint completed between the upper and lower parts of the boot. The rings or plates 15 and 16 are preferably simple strips of sheet steel which are fastened together on the back by a screw bolt or bolts or rivet 20. Their shape and the shape of the entire device conforms to the shape of the hoof and the crimps in the upper part enable the drawing together of the top to make the same fit snugly around the ankle. By removing the strap and expanding the crimps an opening large enough to admit the animal's hoof is exposed. The upper part while being strong as required by the service is still flexible and can in no way do harm to the hoof or ankle.

When the boot is in place it fits so snugly around the ankle as to prevent leakage of the oil or other liquid or compound in which the hoof is packed.

The steel bottom has sufficient strength, is light, and owing to its use the shoe need not be taken from the animal's hoof when the boot is used as the calks cannot pierce the metal. The small bolt heads or nuts 6 serve as nails to prevent slipping. All exterior edges and corners are nicely rounded and made smooth.

Having thus described my invention, I claim as new and desire to secure by Letters Patent—

1. In a soaking boot, the combination, with the crimped flexible top, of means for drawing the upper part thereof together, the metallic plates or rings between which the lower edges of the flexible top are held, the metallic bottom plate, and means for securing the same to the first mentioned plates, substantially as described.

2. The combination, with the flexible top 8 having its forward part crimped, of the metallic parts 15 and 16 embracing the lower edge of the flexible part, the metal plate 2, the eye-bolts secured therein, and the eyes of said bolts being secured to the lower edge of the flexible part and the metal parts 15 and 16, substantially as described.

3. The combination, with the flexible part 8 having crimps 10, of the tightening strap arranged in the crimped top for drawing up the same, the metal parts 15 and 16 embracing the lower edge of the flexible part, the bottom plate 2, the eye-bolts passing through the same, the rivets or screws 17 passing through the parts 15 and 16 and in the eyes of said bolts, the packing 18 interposed between the metal parts and the plate 2, and the nuts 6 provided on the lower ends of the eye-bolts for securing the parts together, substantially as described and for the purpose specified.

In testimony whereof I have hereunto set my hand, this 24th day of November, 1893, at Minneapolis, Minnesota.

MILTON N. ROGERS.

In presence of—
C. G. HAWLEY,
M. E. GOOLEY.